US009640029B1

(12) United States Patent
Falciglia

(10) Patent No.: US 9,640,029 B1
(45) Date of Patent: May 2, 2017

(54) BINGO GAMES, GAMING DEVICES AND GAME SYSTEMS HAVING A PLAYER BINGO INDICIA GRAB FEATURE

(71) Applicant: Blastworks, Inc., Seattle, WA (US)

(72) Inventor: Craig Falciglia, Waldwick, NJ (US)

(73) Assignee: Blastworks, Inc., Seattle, WA (US)

( * ) Notice: Subject to any disclaimer, the term of this patent is extended or adjusted under 35 U.S.C. 154(b) by 0 days.

(21) Appl. No.: 14/946,892

(22) Filed: Nov. 20, 2015

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.
CPC ...... *G07F 17/3227* (2013.01); *G07F 17/3276* (2013.01); *G07F 17/3293* (2013.01)

(58) Field of Classification Search
CPC .......... A63F 3/06; A63F 3/062; A63F 3/0645; G07F 17/326; G07F 17/3262; G07F 17/3272
See application file for complete search history.

(56) References Cited

U.S. PATENT DOCUMENTS 4,213,616 A 7/1980 Dickey
2002/0111207 A1* 8/2002 Lind .................... G07F 17/32 463/19
2005/0059467 A1* 3/2005 Saffari .................... G07F 17/32 463/19
2005/0059470 A1* 3/2005 Cannon .......................... 463/19
2005/0059471 A1* 3/2005 Cannon ............... G07F 17/3267 463/19
2005/0119042 A1* 6/2005 Chamberlain .......... G07F 17/32 463/19
2005/0187014 A1* 8/2005 Saffari .................... G07F 17/32 463/27
2014/0024427 A1 1/2014 Cole et al.

OTHER PUBLICATIONS

Landsvogt, Torsten; Pick-a-Dog, Pick-a-Pig rulebook; 2 pages; http://pick-a-pig.com/rules.php; copyright 2012.

* cited by examiner

*Primary Examiner* — Milap Shah
*Assistant Examiner* — Jason Pinheiro
(74) *Attorney, Agent, or Firm* — Weide & Miller, Ltd.

(57) ABSTRACT

In a multi-player bingo type matching game, game players attempt to achieve matching patterns of game indicia associated with assigned game cards. Called game indicia are displayed to the players. The first player to select or grab the called game indicia is permitted to attempt to match the called game indicia to game indicia on their assigned card, while other players are not permitted to use the selected game indicia. If that called game indicia does not match the player's game card, the player loses one or more successive game turns. The winner of the game may comprise the first player who is able to achieve a predetermine winning matching pattern relative to their game card.

17 Claims, 4 Drawing Sheets

BINGO GAMES, GAMING DEVICES AND GAME SYSTEMS HAVING A PLAYER BINGO INDICIA GRAB FEATURE

FIELD OF THE INVENTION

The present invention relates to methods of presenting and playing games and gaming machines configured to present games.

BACKGROUND OF THE INVENTION

Game developers continue to seek to develop games which are new and exciting to play. In the wagering game space, casino game manufacturers have adapted traditional card games to electronic gaming machines, such as in the form of video poker games and the like. Traditional spinning reel slot machines have been adapted to video form. These games may further include various bonus events or secondary features.

One aspect of traditional slot and video wagering games presented by gaming machines is that they are generally for play by a single player. Thus, the game play is a generally solitary event. While some tournament style games have been developed, they still often lack player interaction.

Accordingly, the invention herein has been developed to address these and other issues.

SUMMARY OF THE INVENTION

Embodiments of the invention comprise methods of playing and/or presenting games, gaming machines or devices, and gaming systems. One embodiment of the invention comprises a bingo-type matching game having a called game indicia selection or grab feature.

In one embodiment of a game method, a bingo type matching game is presented to two or more players. Each player preferably participates in the game via a gaming machine.

At least one game card is assigned to each player. Each game card has a number of associated game indicia.

The game proceeds with one or more rounds or turns. In each turn, one or more game indicia are called and are displayed to the players. The players may attempt to select or grab the called game indicia. In one embodiment, the first player to select or grab the called game indicia is provided the opportunity to play the called game indicia (whereas the remaining players may not play that called game indicia).

If the called game indicia matches a game indicia associated with the first player's game card, a match is indicated. If the called game indicia does not match, then in one embodiment of the invention that player loses one or more subsequent turns or rounds of the game.

In one embodiment, when the called game indicia is displayed, each player may provide input in an attempt to select or grab the called game indicia, such as input to a "grab" button. If a player loses one or more turns, the player's gaming machine or the "grab" button may be temporarily locked or frozen to prevent player input. Alternatively, any input by that player may be ignored.

In one embodiment, an object of the game is to obtain a predetermined configuration or pattern of matches relative to a game card. The game may end when a player receives such a pattern of matches.

In one embodiment, a player may be required to place an entry fee or place a wager in order to participate in the game. In a wagering game configuration, winnings may be paid to the winning player.

In one embodiment, the game may be presented via a gaming system which includes at least one game server which communicates with gaming machines which are played by the players. Such gaming machines might comprise casino style gaming machines, computing devices or the like, such as in casino or Internet environments.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods of playing and presenting games, and gaming machines and systems configured to present games. In a preferred embodiment, the methods of game play and presentation are implemented via a gaming machine or device. Such a gaming machine may have various configurations.

The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 1:
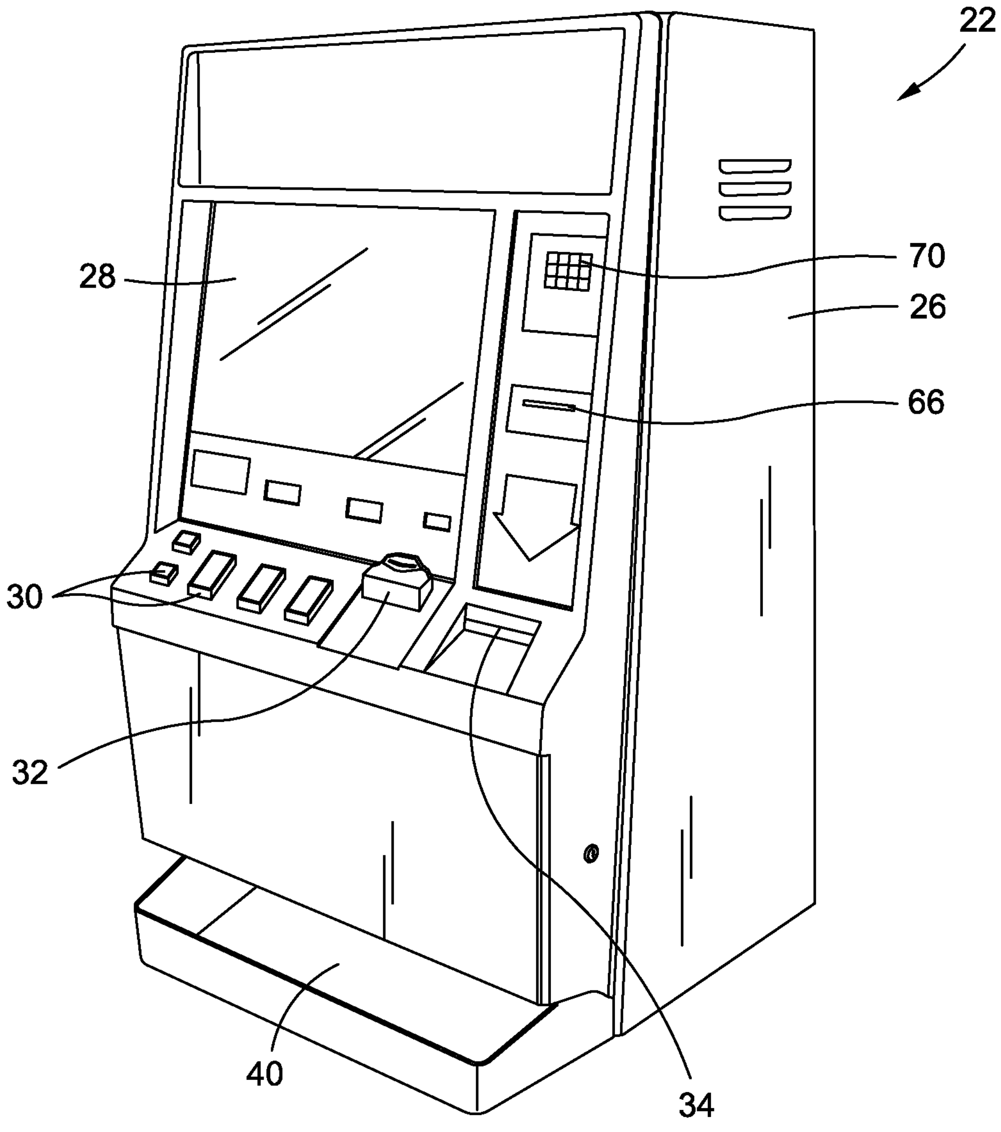
FIG. 1 illustrates a gaming machine in accordance with one embodiment of the invention.

One configuration of a gaming machine 22 is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one display device 28 configured to display game information. The display device 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touch-screen, a light emitting display (LED) or other suitable displays now known or later developed, in a variety of resolutions, sizes and formats (e.g. 4:3, widescreen or the like). The display 28 may be capable of projecting or displaying a wide variety of information, including images, symbols and other indicia or information associated with game play, game promotion or other events. The gaming machine 22 might include more than one display device 28, such as two or more displays 28 which are associated with the housing 26. The gaming machine 22 might also include a top box or other portion. Such a top box might include one or more display devices 28, such as in addition to one or more main displays which are associated with the housing 26. Also, the gaming machine 22 might include side displays (such as mounted to the exterior of the housing 26) and might include multiple displays of differing sizes.

As described in more detail below, the gaming machine 22 is preferably configured to present one or more games upon a player making a monetary payment or wager. In this regard, as described in more detail below, the gaming machine 22 includes means for accepting monetary value.

In one embodiment, as detailed above, certain game outcomes may be designated as winning outcomes. Prizes or awards may be provided for winning outcomes, such as monetary payments (or representations thereof, such as prize of credits), or promotional awards as detailed herein. As detailed below, the gaming machine 22 includes means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game, to indicate bingo balls or indicia to be "grabbed", as disclosed herein, to "cash out" of the gaming machine, or to provide various other inputs.

In one preferred embodiment, the gaming machine 22 includes at least one microprocessor or controller for controlling the gaming machine, including receiving player input and sending output signals for controlling the various components of the machine 22 (such as generating game information for display by the display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information comprising bingo game cards, bingo balls or the like, as detailed below), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. The memory may also store other information, such as pay table information. The gaming machine 22 may also include one or more random number generators for generating random numbers, such as for use in selecting bingo balls or bingo indicia as described herein for presenting the game in a random or partially random fashion (e.g. whereby the game is presented in a manner in which the player cannot control the outcome or by which the game involves some element of skill on the part of the player).

Preferably, the controller is configured to execute machine readable code or instructions which are configured to implement the method of game play of the invention. For example, the controller of the gaming machine 22 may be configured to detect a wager, such as a signal from a player's depressing of the "bet one" button. Upon such an event and/or the player otherwise signaling the gaming machine to present the game, the controller may be configured to cause game symbols or other game information to be displayed on the at least one display 28. The controller may accept input from a player of game inputs, such as a request to spin reels or the like, via the one or more player input devices of the gaming machine 22.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 22 is configured to present one or more wagering games. Thus, the gaming machines 22 is preferably configured to accept value, such as in the form of coins, tokens, paper currency or other elements or devices representing value such as monetary funds. For example, as illustrated in FIG. 1, the gaming machine 22 might include a coin acceptor 32 for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 22 dispensing coins to a coin tray. In another embodiment, funds may be issued by dispensing paper currency. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference.

The gaming machine 22 may also include a player tracking device, such as a card reader 66 and associated keypad 70. Such player tracking devices are well known and may permit the game operator to track play of players of the gaming machine. The tracked play may be utilized to offer player bonuses or awards.

A casino may have numerous such gaming machines 22, such as located on a casino floor or in other locations. Of course, such gaming machines 22 might be used in other environments, such as an airport, a bar or tavern or other locations.

It will be appreciated that the gaming machine illustrated in FIG. 1 is only exemplary of one embodiment of a gaming machine. For example, it is possible to for the gaming machine to have various other configurations, including different shapes and styles and having different components than as just described.

For example, instead of comprising a "casino"-style gaming machine, it is possible for the game of the invention to be presented on a gaming machine which comprises a computing device, such as a home or office computer (desktop, laptop computer or the like) or a player's mobile electronic device such as a PDA, tablet, phone or the like (wherein such computing devices generally include at least one processor configured to execute machine readable code or instructions, at least one memory configured to store data such as the machine readable code, at least one display device such as an electronic video display, and at least one user input device such as one or more buttons, a touch screen or the like).

Figure 2:
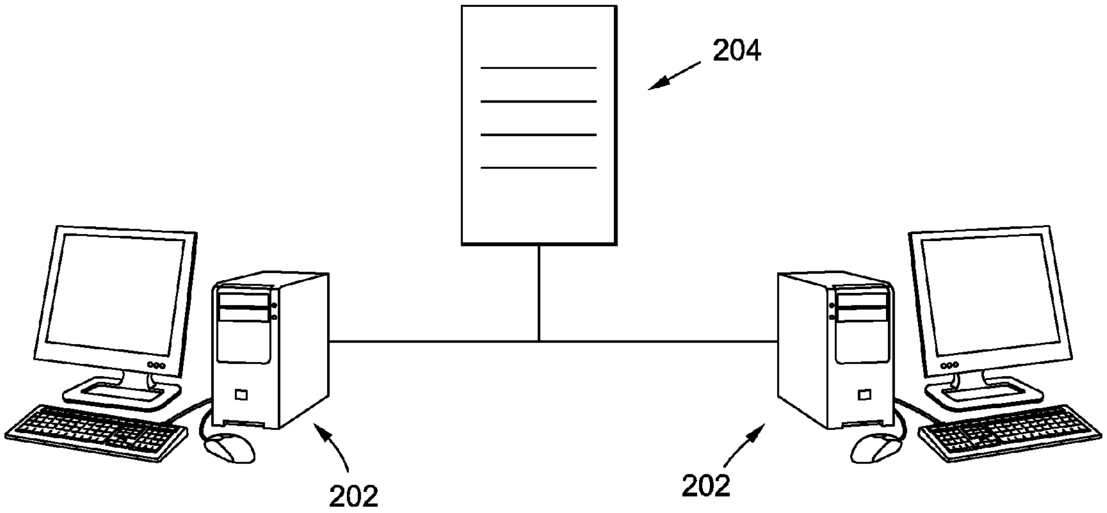
FIG. 2 illustrates other embodiments of gaming machines in accordance with the invention relative to an embodiment of a gaming system of the invention.

For example, as illustrated in FIG. 2, in one embodiment, a player might utilize such a gaming machine 202 to connect or log into a game server 204. The game server 204 (such as a controller thereof) may cause game information to be delivered to the player's gaming machine/computer 202 via a communication link and then be displayed on a display of the player's gaming machine/computer 202. The communication link might comprise or include the Internet, a casino network such as a wired or wireless LAN, or combinations of public and/or private networks including wired and/or wireless links.

Similarly, a casino-style gaming machine 22 such as that described above might connect to a game server or controller and obtain game information from the server and/or exchange information with the game server, such as in a "server-based" gaming system.

The game server or controller may comprise more than one device. For example, in a server-based environment, a controller at a server may generate game information and transmit that information to a local controller at a gaming machine. The local controller at the gaming machine may then cause game information to be displayed on one or more associated displays.

In a server-based configuration, two or more gaming machines may be connected to the game server, such as illustrated in FIG. 2. For example, in an Internet based configuration, two or more players might connect to a game server via their gaming machines/computers. In a casino environment, two or more gaming machines might similarly be linked to a casino game server. In other embodiments, it is possible for two or more players to play a single gaming machine or device. For example, a single gaming machine might include multiple player stations or displays or be configured to simultaneously display game information for multiple players.

In one embodiment, one or more players of the game might be implemented as or comprise automated players or "Bots". Such a Bot might be implemented via a gaming machine or a game server. For example, a live player of a gaming machine might play against a Bot which is implemented by the gaming machine, a game server or another gaming machine.

It is also possible to present games of the invention a game table or the like. For example, players might play physical printed game or bingo cards, such as while sitting at a table. Physical bingo balls might be drawn and players might attempt to be the first to reach out and grab the called bingo ball. Players might use chips or the like to place entry fees.

Figure 3:
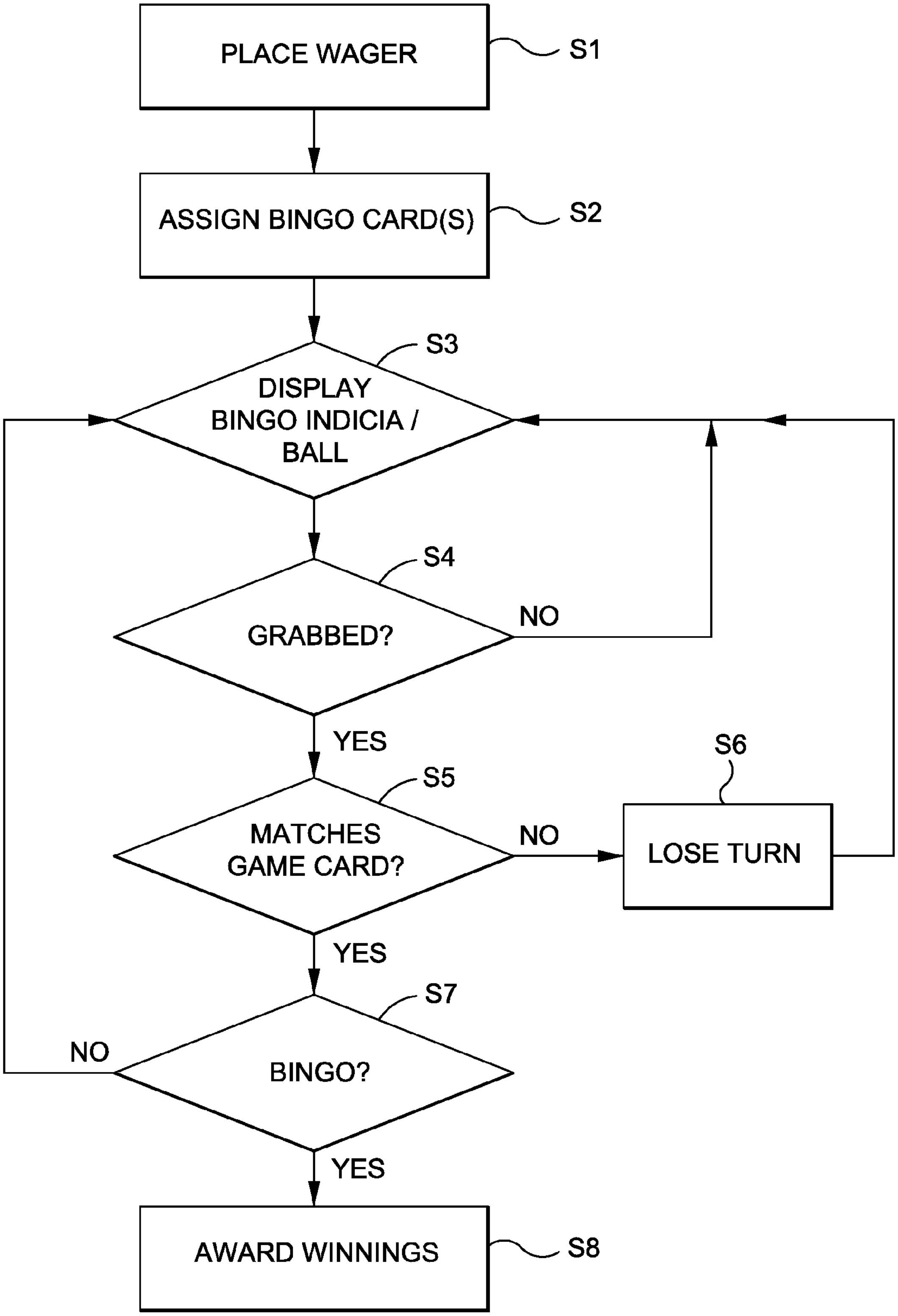
FIG. 3 illustrates a flow diagram of a method of game play.

One embodiment of a method of playing and presenting a game in accordance with an embodiment of the invention will be described with reference to FIG. 3.

In one embodiment, in step S1 a player enters the game. In one embodiment, such could comprise simply providing a "play game" input. In other embodiments, a player may only be permitted to play the game upon payment, such by placing an entry fee or a wager. As indicated above, such may comprise a player providing a number of credits at a gaming machine, using a credit card or other financial account or the like to provide monetary value funds or other credits or the like. In other embodiments, the entry fee or wager might comprise points or other elements.

In some embodiments, the size of the entry fee or wager might affect certain features of the game, such as the number of game cards which the player is assigned and may play or the type and/or size of prizes or winnings which might be awarded for winning outcomes.

One or more bingo or game cards are assigned to the player in a step S2. In one embodiment, a player might purchase or play one card, although in other embodiments, a single player might purchase or play two or more cards relative to a single bingo game.

The game cards may be provided electronically. For example, relative to the system illustrated in FIG. 2, upon a player placing a wager, the server 204 may assign a game card to a player and transmit game card information to the gaming machine 202 that the player is playing. This game card may be displayed to the player at their gaming machine, such as on an associated video display thereof.

Figure 4:
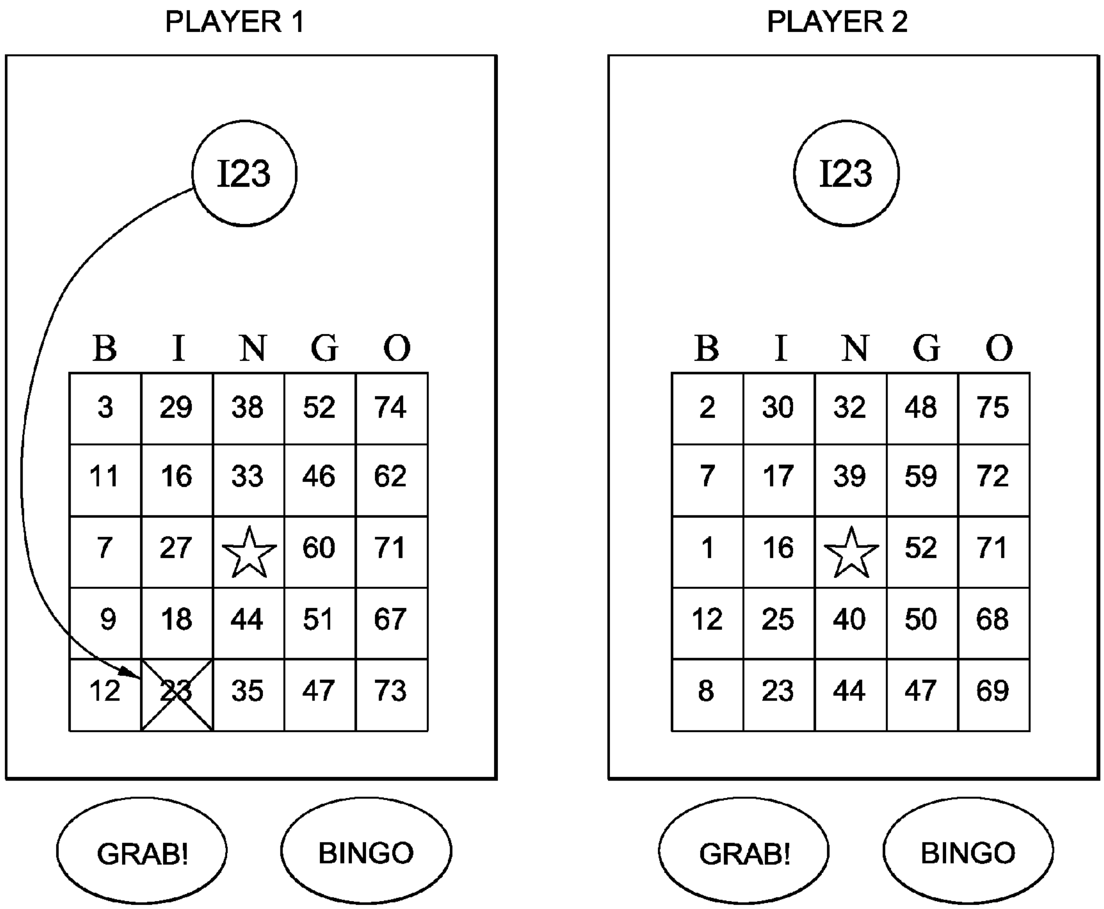
FIG. 4 illustrates example game displays in accordance with an embodiment of the invention.

The bingo or other game card may have various configurations. The game card bears game indicia, and preferably two or more game indicia selected from a larger set of game indicia. Such game indicia might comprise numbers or other designations. For example, the card might comprise a bingo card having numbers arranged in a 5 by 5 grid (totaling 25 numbers arranged into five rows and five columns). The numbers on the cards might comprise numbers selected from the group of numbers 1-75, which numbers are randomly assigned to the locations of the card. In some embodiments, numbers from the group 1-15 are randomly selected for the 5 spots of the first column, numbers from the group 16-30 are randomly selected for the 5 spots of the second column, etc. for each card. One card configuration is illustrated in FIG. 4 wherein numbers 1-75 may be associated with columns designated "B" "I" "N" "G" and "O" and balls or objects may be similarly marked (such as B5; N42, etc.)

For example, FIG. 4 illustrates an example of the game wherein a gaming machine of a first player, Player 1, displays a graphical representation of a bingo card assigned to that player. Likewise, the gaming machine of a second player, Player 2, displays a graphical representation of a bingo card assigned to that player.

In one embodiment, certain criteria may have to be satisfied before a game can be initiated. In one embodiment, two or more players may be required before a game can begin. Thus, two or more players may be required to purchase game cards or place wagers before the game begins. In one embodiment, for example, the server 204 may determine if the required game conditions have been met. Until that time, for example, a player might be notified that the game has not yet started. If a game is ready to begin, a count-down timer to the start of the game or other indication might be provided to the player(s).

In one embodiment, the object of the game is for a player to achieve one or more combinations of matches of grabbed game indicia with game indicia associated with their game card. The game is preferably presented in one or more rounds or turns. In each round, one or more objects which are similarly numbered or designated as the indicia which are associated with the game cards are drawn or selected, as in a step S3. In one embodiment, the game cards have bingo numbers associated therewith and the objects may comprise bingo balls, either in electronic or physical form, which are labeled or bear the bingo numbers (such as the numbers one to seventy-five (1-75) with an associated letter). The balls or other objects may be physical objects, but are preferably electronically represented (such as by a captured image thereof or a representative graphical image) and displayed to the game players. For example, the game indicia such as the bingo ball or bingo numbers, are preferably displayed to each player via the gaming machine that they are playing, via one or more associated common displays or the like. FIG. 4 illustrates such a configuration, wherein the selected game indicia comprising the bingo number "123" has been displayed to both Player 1 and Player 2 of the game.

In one embodiment, the objects or other game indicia may be selected in one or more sets or "draws". For example, in one embodiment of a game, there is a first single ball draw of thirty (30) numbers or designations which may be represented as balls. In a preferred embodiment, however, only one called game indicia is displayed to the players during each game round.

In the game, the game indicium which are associated with the objects are compared to the game indicium which are associated with the game cards to determine matches and potential wins. Importantly, in accordance with the present invention, a selected or "called" game indicia cannot be "played" by a player until the player selects or grabs the game indicia. In one embodiment, only the first player to select or grab the game indicia can play the game indicia.

In one embodiment, in a step S4, when a game indicia is displayed, a player may select or grab the indicia, such as by touching a touch screen which is associated with a video display in the area where the indicia is displayed, by pressing a button (such as "Grab" button, as illustrated in FIG. 4), or by providing other required input to their gaming machine. In a server-based system, the server may receive input from the gaming machines and determine which player "grabbed" the indicia first (for example, when a player presses the "grab" button, the gaming machine may send a signal to the game server and the game server may then evaluate which "grab" input was first, either with reference to the order in which the signals were received at the server, time stamps associated with the inputs at the gaming machines or the like).

In one embodiment, in step S4 if the player did not grab the indicia (either electively or because they were, for example, not the first player to grab it), then the player may be required to wait for the next indicia to be selected and displayed in another round of play, as in step S3. In one embodiment, for example, none of the players might grab or select the indicia. In such event, a new game indicia may be selected and displayed (for example, if no player grabs or selects a displayed indicia within x seconds of it being displayed, it may be removed and a new game indicia may be selected and displayed to the players). As disclosed below, in one embodiment, if a particular game indicia is grabbed by one player, it might be called again at a later time, thus allowing another player to grab it later in the game.

If the player did grab the called indicia and is entitled to attempt to play the indicia, then in a step S5, that indicia may be compared to the player's game card. It is noted that the process of matching may require input from the player (such as requiring a player to place a "daub" button). In other embodiments, the matching might occur automatically. If the grabbed indicia matches one of the indicia on the player's game card, a matching indication might be provided such as by displaying an "X" (such as illustrated in FIG. 4) or by other indication.

FIG. 4 illustrates an example where the bingo indicia 123 was selected and displayed to the players. Player 1 grabbed the indicia first (such as by hitting their "Grab" button before Player 2). That indicia was compared to the player's game card and matched indicia 123 on the card, and thus a matching condition was indicated.

In one embodiment of a game of the invention, if a player grabs or selects a game indicia and that indicia does not match any indicia on their one or more game cards (or is duplicative of an earlier match), then the player loses one or more turns, as indicated in step S6. In one embodiment, when a player loses a turn, the player is not permitted to select or grab the next displayed game indicia. In one embodiment, a player may lose two or more turns for selecting or grabbing an unusable indicia, thus losing the chance to grab or select any of the next four displayed game indicia.

In one embodiment, when a player has lost one or more rounds or turns, the player's gaming machine may be locked or frozen (such as via a signal from the game server) in a manner which at least prevents the player from attempting to grab a called game indicia. For example, during that time a player's "grab" button may be inactivated. A notification of the game status may be displayed to the player such as "X lost turns remaining." In other embodiments, the player might be permitted to attempt to grab or select a called indicia, but the gaming machine or game server may simply ignore any input by the player during a lost turn or round.

In one embodiment, one or more game outcomes (but not all potential outcomes) are designed as winning outcomes. In a game of bingo, the winning outcomes may be particular patterns of matches of the indicia on a card to the selected or grabbed indicia, such as a diagonal, horizontal or vertical line of player numbers, an "X" pattern or the like. In one embodiment, a winning pattern is selected at the beginning of each game and is displayed to the players. The players attempt to obtain matches until they achieve that designated winning pattern. The player who is first to achieve the winning pattern (and, if necessary, indicates such as win such as via the "Bingo" input) is the winner and the game ends.

In one embodiment, if a match results in a winning outcome, the winning outcome might be automatically indicated to the winning players and/or other players. In another embodiment, a player might be required to indicate the win, such as by input to a "BINGO" button or the like (such as illustrated in FIG. 4). In that event, if the player does not provide the required input, the game may continue and another player might receive and indicate a winning condition, which might result in that player being deemed the winner of the game.

In step S7, if a bingo event has occurred or been declared, then the game may end and, in step S8, winnings may be awarded. Otherwise, the game may continue at step S3 with the selection and display of another game indicia.

As indicated, if a bingo or other game winning outcome has occurred, then in a step S8, winnings may be awarded. Awards for winning outcomes of the game may be defined by a pay table, such as dependent upon the size of the player's wager, or might comprise a pot or jackpot, fixed award, non-monetary prizes or the like. When the game is presented via an electronic gaming machine or a gaming system, the pay table may be stored in a memory or data storage device of the gaming machine or a server of the gaming system.

When the game is presented via a gaming machine, such as by the system illustrated in FIG. 2, various of the steps of the invention may be performed by the gaming machine and/or server. For example, the game server may be configured to generate game cards, randomly select balls or game numbers, track and display matches of game numbers to game cards, etc. In such a configuration, steps of the game might be implemented via machine readable code which is stored at a memory of the game server and executed by the controller of the game server. The game might be presented via a browser or other application running on the player's gaming machine which communicates with the game server.

The invention has a number of exciting features. In traditional bingo games, called bingo balls are played by all players. On the other hand, in accordance with the invention, players of the game compete against one another to grab called indicia. In one embodiment of the invention, only the first player to select or grab the game indicia can play or use that indicia. In one embodiment, this introduces an exciting skill feature into the game, which skill feature impacts the outcome of the game. The feature generates excitement because it pits players against one another during the game and puts pressure on the players to quickly view and select indicia as they are displayed. In addition, the pace of the game is heightened because players will naturally want to select displayed indicia as fast as possible so as to not get beat out by other players. This causes the game to be fast paced.

At the same time, the game has a penalty feature wherein a player is penalized turns for selecting or grabbing a displayed indicia which does not match their game card. The penalty feature thus puts pressure on the player as part of the selection process—e.g., heightening the skill element.

The game of the invention may have various configurations, features and variations. For example, in the game of bingo the same bingo ball or game number is not called more than once during the game. However, in one embodiment of the present game, a bingo ball or game number may be called more than once. This gives other players the chance to receive a game indicia which was called but which another player grabbed first.

In one embodiment, a player might be permitted to grab and discard or waste a called game indicia, such as to prevent that game indicia from being obtained by another player. In one embodiment, the number of times that a player might waste a game indicia (such as a called bingo number/ball) might be limited, such as to one or two times per game, such as to prevent a player from abusing the feature or completely blocking other players. In one embodiment, when a player grabs and wastes a game indicia (such as a bingo number/ball), the game indicia goes into a waste or discard pile and can no longer be used in the game. If this option is provided, once a player grabs a game indicia, the options "play" or "waste" might appear, forcing the player to make an election. If the player has no more waste or discard options remaining and the grabbed indicia cannot be played, then the player may lose one or more turns as detailed above.

Variations of bingo games may be implemented relative to the features of the invention. For example, in some embodiments, interim prizes might be awarded, such as for matching patterns which are not game winning patterns. As one example, an interim win might be awarded to a player that obtains a "four corners" matching pattern before a game winning "X" pattern is achieved by a player.

Bingo cards and bingo indicia might include wilds or other features which accelerate matches or the like as part of forming winning combinations. As one example, in one embodiment one or more of the game indicia might comprise a Wild or Joker. The player who successfully grabs or selects such an indicia might be permitted to use it to match any indicia on their game card. Of course, various other types of game indicia having different features or effects might be utilized in the game.

In one embodiment, the game cards of other players may be displayed to each player, thus allowing the player to see the progression of other players towards a game win.

In one embodiment of the game, more than one game indicia might be called or displayed during each game round. For example, two or more game indicia might be called and the players to the game might attempt to be the first player to grab or select each of the called game indicia. In such a configuration, a first player might grab one called game indicia and a second player might grab another called game indicia, while other players to the game might then not successfully grab any of called game indicia in that round. In another variation, the "grab" feature might be intermixed with the call of game indicia which all players may play. For example, in one embodiment of a game certain game indicia may be called which all players may play. At certain times, a called game indicia may be displayed with a "GRAB" identifier, meaning that only the first player to grab that called indicia may attempt to play that game indicia.

Likewise, more than one player, but not all players, might be permitted to grab or select a displayed game indicia. For example, in a game of ten players, the first two players might be permitted to grab a displayed indicia.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting a matching game played by two or more players via a gaming system comprising at least one game server, a first gaming machine and at least one second gaming machine, said first and second gaming machines each having a wager accepting device configured to accept an item associated with a monetary value, thereby creating a credit balance, and at least one display device, comprising the steps of:

receiving a wager from a player of said first gaming machine and reducing said credit balance associated with said first gaming machine;

receiving a wager from a player of said second gaming machine and reducing said credit balance associated with said second gaming machine;

assigning, at said at least one game server, at least one game card to said player of said first gaming machine and at least one game card to said player of said second gaming machine, each game card having a plurality of associated game indicia selected from a set of game indicia;

displaying said least one game card assigned to said player of said first gaming machine on said at least one display device of said first gaming machine;

displaying said least one game card assigned to said player of said second gaming machine on said at least one display device of said second gaming machine;

implementing a plurality of game turns comprising:

selecting, at said at least one game server, at least one called game indicia selected from said set of game indicia and causing said at least one called game indicia to be displayed at said at least one display device of said first gaming machine and said at least one display device of said second gaming machine;

determining, at said at least one game server, a first player of said two or more players to select said at least one called game indicia; and permitting only said first player to attempt to match said at least one called game indicia to said game indicia associated with said at least one game card assigned to said first player, wherein if said at least one called game indicia matches a game indicia associated with said at least one game card assigned to said first player, permitting a match thereof, while preventing each remaining player of said two more players from attempting to match said at least one called indicia to said game indicia associated with their at least one assigned game card even if said at least one called game indicia corresponds to a game indicia associated with the at least one game card assigned to them;

and providing a credit balance increasing award when at least one winning game outcome is obtained, said at least one winning outcome comprising at least one predetermined matching pattern relative to an assigned game card.

2. The method in accordance with claim 1 further comprising causing said first player to select said at least one called game indicia to lose one or more successive game turns if said at least one called game indicia does not match a game indicia associated with said at least one game card assigned to said first player.

3. The method in accordance with claim 2 wherein said causing said first player to select said at least one called indicia to lose one or more successive game turns comprises preventing input by said player of the selection of said at least one called game indicia at said gaming machine played by said player during said one or more successive game turns.

4. The method in accordance with claim 1 wherein said game indicia comprise bingo indicia comprising a combination of a letter and a number.

5. The method in accordance with claim 1 further comprising the step of receiving information at said at least one game server regarding player input to said first gaming machine u said at least one second gaming machine by a player thereof of a selection of said at least one called indicia.

6. The method in accordance with claim 5 wherein said information comprises information regarding a player's input to a button.

7. The method in accordance with claim 1 wherein said credit balance comprise one or more points or monetary value credits.

8. The method in accordance with claim 1 wherein if said at least one called game indicia matches a game indicia associated with at least one game card assigned to said player and said player provides a matching daub input, permitting a match thereof.

9. The method in accordance with claim 1 wherein if none of said two or more players selects said at least one called game indicia within a predetermined time period, permitting none of said two or more players to attempt to match said at least one called game indicia to their at least one assigned game card.

10. A gaming system comprising:

at least one game server comprising a memory device, a processor, at least one communication interface which permits said game server to transmit information to a first gaming machine and a second gaming machine and to receive information from said first and second gaming machines, said first and second gaming machines each having a wager accepting device configured to accept an item associated with a monetary value, thereby creating a credit balance, and at least one display device; and machine readable code stored in said memory device and executable by said processor to cause said processor to:

assign at least one game card to a player of said first gaming machine in response to a wager placed at said first gaming machine and assign at least one game card to a player of said second gaming machine in response to a wager placed at said second gaming machine, each game card having a plurality of associated game indicia selected from a set of game indicia;

cause said at least one display device of said first gaming machine to display said at least one game card assigned to said player of said first gaming machine;

cause said at least one display device of said second gaming machine to display said at least one game card assigned to said player of said second gaming machine;

implement a plurality of game turns comprising:

selecting at least one called game indicia selected from said set of game indicia;

transmitting information regarding said at least one called game indicia to be displayed at said at least one display device of said first gaming machine and said at least one display device of said second gaming machine;

determining a first player of said two or more players to select said at least one called game indicia; and permitting only said first player to attempt to match said at least one called game indicia to said game indicia associated with said at least one game card assigned to said first player, wherein if said at least one called game indicia matches a game indicia associated with said at least one game card assigned to said first player, permitting a match thereof, while preventing each remaining player of said two more players from attempting to match said at least one called indicia to said game indicia associated with their at least one assigned game card even if said at least one called game indicia corresponds to a game indicia associated with the at least one game card assigned to them;

and providing a credit balance increasing award when at least one winning game outcome is obtained, said at least one winning outcome comprising at least one predetermined matching pattern relative to an assigned game card.

11. The gaming system in accordance with claim 10 wherein said machine readable code is configured to cause said first player to select said at least called game indicia to lose one or more successive game turns if said at least one called game indicia does not match a game indicia associated with said at least one game card assigned to said first player.

12. The gaming system in accordance with claim 11 wherein said causing said first player to select said at least one called indicia to lose one or more successive game turns comprises preventing input by said player of the selection of said at least one called game indicia at said gaming machine played by said player during said one or more successive game turns.

13. The gaming system in accordance with claim 10 wherein said machine readable code is configured to select at least one new called game indicia if no player selects said at least one called game indicia within a predetermined time period.

14. The gaming system in accordance with claim 10 comprising selecting a first called game indicia in a first game turn and selecting said first called game indicia again in one or more later turns.

15. A method of presenting a matching game played by two or more players via a gaming system comprising at least one game server, a first gaming machine and at least one second gaming machine, said first and second gaming machines each having a player input for accepting a wager and at least one display device, comprising the steps of:

receiving a wager from a player of said first gaming machine and reducing a credit balance associated with said first gaming machine;

receiving a wager from a player of said second gaming machine and reducing a credit balance associated with said second gaming machine;

assigning, at said at least one game server, at least one game card to said player of said first gaming machine and at least one game card to said player of said second gaming machine, each game card having a plurality of associated game indicia selected from a set of game indicia;

displaying said least one game card assigned to said player of said first gaming machine on said at least one display device of said first gaming machine;

displaying said least one game card assigned to said player of said second gaming machine on said at least one display device of said second gaming machine;

implementing a plurality of game turns comprising:

selecting, at said at least one game server, at least one called game indicia selected from said set of game indicia and causing said at least one called game indicia to be displayed at said at least one display device of said first gaming machine and said at least one display device of said second gaming machine;

determining, at said at least one game server, a first player of said two or more players to select said at least one called game indicia; and permitting only said first player to attempt to match said at least one called game indicia to said game indicia associated with said at least one game card assigned to said first player, wherein if said at least one called game indicia matches a game indicia associated with said at least one game card assigned to said first player, permitting a match thereof, while preventing each remaining player of said two more players from attempting to match said at least one called indicia to said game indicia associated with their at least one assigned game card even if said at least one called game indicia corresponds to a game indicia associated with the at least one game card assigned to them;

and providing a credit balance increasing award when at least one winning game outcome is obtained, said at least one winning outcome comprising at least one predetermined matching pattern relative to an assigned game card.

16. The method in accordance with claim 15 further comprising causing said first player to select said at least one called game indicia to lose one or more successive game turns if said at least one called game indicia does not match a game indicia associated with said at least one game card assigned to said first player.

17. The method in accordance with claim 16 wherein said causing said first player to select said at least one called indicia to lose one or more successive game turns comprises preventing input by said player of the selection of said at least one called game indicia at said gaming machine played by said player during said one or more successive game turns.

* * * * *